US011173684B2

(12) United States Patent
Sallot et al.

(10) Patent No.: US 11,173,684 B2
(45) Date of Patent: Nov. 16, 2021

(54) METHOD FOR MANUFACTURING A PAPERBOARD CUP COATED WITH BIODEGRADABLE VARNISH AND CUP MANUFACTURED ACCORDING TO THE METHOD

(71) Applicant: C.E.E. COMPAGNIE EUROPEENNE DES EMBALLAGES ROBERT SCHISLER, Thouars (FR)

(72) Inventors: Thierry Sallot, Mauze-Thouarsais (FR); Claire Schisler, Thouars (FR)

(73) Assignee: C.E.E. COMPAGNIE EUROPEENNE DES EMBALLAGES ROBERT SCHISLER, Thouars (FR)

( * ) Notice: Subject to any disclaimer, the term of this patent is extended or adjusted under 35 U.S.C. 154(b) by 247 days.

(21) Appl. No.: 16/135,551

(22) Filed: Sep. 19, 2018

(65) Prior Publication Data
US 2019/0084264 A1 Mar. 21, 2019

(30) Foreign Application Priority Data
Sep. 19, 2017 (FR) ........................... 1758657

(51) Int. Cl.
*B31B 50/74* (2017.01)
*B31B 50/88* (2017.01)
(Continued)

(52) U.S. Cl.
CPC ............ *B31B 50/745* (2017.08); *B31B 50/20* (2017.08); *B31B 50/64* (2017.08); *B31B 50/741* (2017.08);
(Continued)

(58) Field of Classification Search
CPC .......... B31B 2105/00; B31B 2105/001; B31B 2105/0022; B31B 2105/0024;
(Continued)

(56) References Cited

U.S. PATENT DOCUMENTS 3,235,401 A * 2/1966 Fowells ................. D21H 23/78
427/348
3,516,852 A * 6/1970 Janssen .................. C09J 163/00
426/123
(Continued)

FOREIGN PATENT DOCUMENTS

DE 961053 C 3/1957
JP 2003013391 A 1/2003
WO 9426513 A1 11/1994

OTHER PUBLICATIONS

Presentation of biodegradable cup production at Assignee CEE Schisler—Retrieved from URL https://www.youtube.com/watch?v=pKXVm6EgUxQ on Nov. 26, 2020 (Year: 2020).*

(Continued)

*Primary Examiner* — Valentin Neacsu
(74) *Attorney, Agent, or Firm* — David D. Brush; Westman, Champlin & Koehler, P.A.

(57) ABSTRACT

A method is proposed for manufacturing a cup intended for containing a food beverage. The method includes cutting out at least one sheet of coated paperboard to form a side wall and a bottom and joining the sheets thus cut out by heat-sealing to form the cup. The at least one paperboard sheet is coated on at least the interior side of the cup with a biodegradable varnish according to a coating/spreading technique. In this way, the cup is easy to manufacture, and complies with environmental standards in being easy to recycle and compost, even at home. Thus, the biodegradable varnish does not disturb or pollute the operation of the pulper used in the paper industry.

10 Claims, 4 Drawing Sheets

(51) Int. Cl.
B31B 50/64 (2017.01)
B31B 50/20 (2017.01)
B31B 120/40 (2017.01)
B31B 110/10 (2017.01)
B31B 105/00 (2017.01)

(52) U.S. Cl.
CPC .......... B31B 50/747 (2017.08); B31B 50/88 (2017.08); *B31B 2105/0022* (2017.08); *B31B 2110/10* (2017.08); *B31B 2120/402* (2017.08)

(58) Field of Classification Search
CPC . B31B 2110/10; B31B 2110/20; B31B 50/14; B31B 50/142; B31B 50/16; B31B 50/20; B31B 50/28; B31B 50/64; B31B 50/649; B31B 50/74; B31B 50/741; B31B 50/745; B31B 50/747; B31B 50/75; B31B 50/88; B31B 50/756; B31B 50/753; B31F 1/0038; B31F 1/0041
USPC ....... 493/53, 154, 155, 96, 97, 55, 907, 108, 493/320, 56, 52; 229/403, 400, 4.5; 428/34.2, 219, 332, 334, 341, 342
See application file for complete search history.

(56) References Cited

U.S. PATENT DOCUMENTS

| | | | | |
|---|---|---|---|---|
| 4,836,400 A * | 6/1989 | Chaffey | ............... | B65D 3/10 220/612 |
| 5,656,081 A * | 8/1997 | Isen | ............... | B41N 1/16 118/46 |
| 5,964,400 A * | 10/1999 | Varano | ............... | B65D 81/3869 229/403 |
| 5,992,489 A * | 11/1999 | Busse | ............... | B31D 1/005 156/443 |
| 6,025,079 A * | 2/2000 | Ciocca | ............... | B32B 27/32 428/515 |
| 6,085,970 A * | 7/2000 | Sadlier | ............... | B65D 3/22 229/198.2 |
| 6,257,485 B1 * | 7/2001 | Sadlier | ............... | B65D 3/22 229/198.2 |
| 6,482,481 B1 * | 11/2002 | Fredricks | ............... | B29C 44/12 428/34.2 |
| 6,652,435 B1 * | 11/2003 | Sand | ............... | B29C 65/7802 493/104 |
| 8,172,127 B2 * | 5/2012 | Frost | ............... | B65D 25/36 229/403 |
| 10,040,264 B2 * | 8/2018 | Lamie | ............... | B32B 3/10 |
| 2001/0038893 A1 * | 11/2001 | Mohan | ............... | D21H 21/54 428/34.2 |
| 2002/0004110 A1 * | 1/2002 | Breining | ............... | B65D 81/3874 428/34.2 |
| 2004/0126517 A1 * | 7/2004 | Breining | ............... | B65D 81/3874 428/34.2 |
| 2006/0124719 A1 * | 6/2006 | Mannlein | ............... | B65D 3/12 229/403 |
| 2006/0254735 A1 * | 11/2006 | Ono | ............... | D21H 25/06 162/136 |
| 2009/0014506 A1 | 1/2009 | Chang | | |
| 2010/0317500 A1 * | 12/2010 | Sadlier | ............... | B65D 3/22 493/111 |
| 2012/0048918 A1 * | 3/2012 | Hougland | ............... | B65D 3/14 229/400 |
| 2012/0318805 A1 * | 12/2012 | Leser | ............... | B29C 66/1282 220/592.17 |
| 2012/0318807 A1 * | 12/2012 | Leser | ............... | B65D 81/3874 220/592.17 |
| 2012/0318859 A1 * | 12/2012 | Leser | ............... | B29C 44/0446 229/403 |
| 2013/0001287 A1 * | 1/2013 | Stahlecker | ............... | B31D 5/0086 229/400 |
| 2013/0193198 A1 * | 8/2013 | Byun | ............... | B65D 3/06 229/400 |
| 2013/0256394 A1 * | 10/2013 | Moutty | ............... | B65D 1/265 229/400 |
| 2015/0099615 A1 * | 4/2015 | Leser | ............... | B29C 66/542 493/105 |
| 2016/0176143 A1 * | 6/2016 | Knauf | ............... | B31B 50/62 493/82 |
| 2016/0288411 A1 * | 10/2016 | Lamie | ............... | B32B 3/10 |
| 2016/0348318 A1 * | 12/2016 | Koenig | ............... | D21H 17/62 |
| 2017/0119183 A1 * | 5/2017 | Bonney | ............... | B65D 3/22 |
| 2017/0182726 A1 * | 6/2017 | Lips | ............... | B65D 81/3869 |
| 2017/0225423 A1 * | 8/2017 | Knauf | ............... | B31B 50/28 |
| 2017/0340149 A1 * | 11/2017 | Morgan | ............... | B65D 81/3869 |

OTHER PUBLICATIONS

Inventory of "eco-friendly", i.e. "biodegradable" hot beverage cups available for online sales, evidencing the equivalence of the two terms in the art. Retrieved from URL https://greenpaperproducts.com/eco-friendly-hot-cups.aspx on Dec. 2, 2020 (Year: 2020).*
"Biodegradable"—definition by Merriam-Webster, URL https://www.merriam-webster.com/dictionary/biodegradable, retrieved Dec. 5, 2020 (Year: 2020).*
French Search Report and Written Opinion dated May 11, 2018 for corresponding French Application No. 1758657, filed Sep. 19, 2017.
English Translation of Written Opinion dated May 11, 2018 for corresponding French Application No. 1758657, filed Sep. 19, 2017.
English translation of the European Office Action dated Nov. 18, 2020 for corresponding Application No. EP18195504.8.
Kimpimaki et al., "Dispersion Coating", Chapters, Papermaking Science and Technology Book 12, Paper and Paperboard Converting, Second Edition, XP055802456A, dated 2008.
English translation of European Office Action dated May 17, 2021 for related Application No. EP18195504.8.

* cited by examiner

METHOD FOR MANUFACTURING A PAPERBOARD CUP COATED WITH BIODEGRADABLE VARNISH AND CUP MANUFACTURED ACCORDING TO THE METHOD

1. FIELD OF THE INVENTION

The field of the invention is that of the manufacturing of paperboard cups meant to receive beverages. These cups are made out of paperboard sheets pre-cut out of reels, preferably in different widths. More specifically, the invention relates to the fact that the paperboard is coated with a biodegradable varnish applied to at least one face of the paperboard by means of the coating method.

2. TECHNOLOGICAL BACKGROUND

Paperboard cups are utensils very frequently used at present to consume beverages, and are found especially in fast-food outlets and many beverage dispensers for dispensing beverages such as coffee, hot chocolate, vegetable broth, etc. The term "paperboard cup" actually designates recipients constituted by paperboard coated with a layer of polyethylene on at least one of the two faces of the paperboard. These cups are manufactured out of two sheets of pre-cut paperboard so that one of the sheets, once wound, forms a truncated conical structure while the other sheet forms a circular bottom. The paperboard of these cups must be lined with a protective layer so as to make the walls tightly sealed and also enable heat-sealing. In addition, the protective layer in contact with the contents of the cup must comply with food packaging standards and must not generate any sensory impact that might spoil the taste or even the smell of the contents. For many years, manufacturers have used polyethylene (PE) to line the paperboard on one or both of its faces.

Polyethylene fulfils the following functions:
Liquid-proof sealing (the internal and external walls are lined in the case of cold beverages because of the possible phenomenon of condensation outside the cup),
Heat-sealing in sealing the side wall with the bottom of the cup,
printability to customize the cups on the external face,
performing the different steps of manufacture of the cups in compliance with the thicknesses needed for the formatting tools specific to each cup format, without delaminating or damaging the PE layer that provides liquid proofing for the side and bottom sealed joints,
compliance with methods of production controls to check the compliance of the sealed joints and the leakage tests using test solutions on site,
compliance with the EU Commission Regulation (EU) No 10/2011 of 14 Jan. 2011 on plastic materials and articles intended to come into contact with food and especially hot, cold and iced beverages,
absence of sensory impact on the contents of the cup.

At present, billions of cups are manufactured every year. Hence, the question of processing the cups used and recycling the paperboard lined with a protective layer arises after the cup is used. Cups made of PE-lined paperboard are theoretically recyclable. The polyethylene can be separated from the paperboard in order to recycle the constituent elements separately by means of a system of baths since the flotation level of paperboard is different from the flotation level of PE. There is generally no cup retrieval system in a restaurant or home by which PE can be separated from paperboard thus enabling both these elements to be recycled. Quite often, these cups are thrown into the disposal bin for non-recycled items. The presence of PE also leads to the following major drawbacks: the paperboard cups are not biodegradable, compostable or repulpable. Being "not repulpable" means that it is impossible to pass these cups into an apparatus called a "pulper" in the paper industry. This apparatus remakes paperboard paste without separating the PE from the paperboard.

An alternative solution to polyethylene uses polylactic acid (PLA). Cups lined with PLA on one of the two faces of the paperboard are fit to be in direct contact with food and must in this respect comply with the standards defined in the EC regulation No 1935/2004 on food contact materials. As regards respect for the environment, the cups must especially meet the standards EN No 14021 and EN No 13430 which relate to biodegradability and recyclability. Finally, it is preferably for the cups to be recyclable by composting through industrial techniques at 70° C. according to the EN 13432 standard (this standard lays down heavier constraints than do the standards EN No 14021 and EN No 13430). The certification of the cups according to these standards stipulates strict conditions on the choice of the substance used for the protective layer.

Although PLA is generally more advantageous than PE, it nevertheless has the following drawbacks:
the cups are not repulpable in the paper industry in their existing state without separating the PLA from the paperboard. It is almost impossible to separate PLA from paperboard in a conventional bath system as can be done when using PE,
the cups are not compostable at ambient temperature at 30° C. in an individual composter which any individual can possess (this technique has received "OK Compost Home" professional certification from a certifying organization),
PLA-coated paperboard is more difficult to work than PE-coated paperboard in the cup-forming process: there is greater rigidity, a limited range of heat-sealing temperatures, etc.,
the minimum deposit of PLA obtained by extrusion on paperboard is in the range of 25 gr/m$^2$ per face whereas the PE deposit is 12 gr/m$^2$ at 18 gr/m$^2$, implying greater thickness and therefore higher cost,
PLA is more difficult than PE for printing with known inks and known printing techniques. The printing quality gets deteriorated and the resistance of the ink is lower, causing print transfer phenomena that can be visible both inside and outside the cups due to the work in reels,
PLA contains genetically modified organisms (GMO), and certain customers in the paperboard cup industry categorically reject such products.

At present therefore, it is important to find a method of manufacture that enables paperboard cups to preserve these characteristics of food compatibility and printability without any sensory impact while at the same time being repulpable in the paper industry, recyclable, biodegradable, compostable according to the EN 13432 standard, if possible at ambient temperature (30° C., i.e. usable in a home composter), while at the same time complying with manufacturing constraints related to the cup-formatting tools, the cup-forming processes and the quality controls needed to validate the cups.

3. SUMMARY OF THE INVENTION

In one particular embodiment of the invention, a method is proposed for manufacturing a cup intended for a food beverage, comprising a step for cutting out at least one sheet of coated paperboard to form the side wall and bottom and a step for the heat-sealing of the sheets thus cut out to form the cup. The at least one paperboard sheet is coated on at least the interior side of the cup with a biodegradable varnish according to a coating technique.

In this way, the cup thus manufactured is repulpable in the paper industry, recyclable, biodegradable and compostable. The biodegradable varnish does not disturb or pollute the working of the pulper used in the paper industry. The cup thus manufactured is therefore repulpable in the paper industry.

According to a first embodiment, the coating step comprises at least the following four successive sub-steps:
  application of the paperboard sheet to at least one coating applicator cylinder, each cylinder plunging into a tub containing said varnish,
  passage of the thus coated paperboard sheet before an air knife generator,
  passage of the paperboard sheet into at least one drying station,
  passage of the paperboard sheet onto a cooling calender.

In this way, the density of the varnish on the paperboard can be determined with precision and the coated paperboard is sufficiently dry and cooled to be then put on reels.

According to another embodiment, the paperboard sheet is applied against a succession of several cylinders plunging into tubs containing varnish of different densities depending on the deposit to be made, the first tubs placed in contact with the paperboard having greater dilution than the following tubs for an application in several layers on a same face. In this way, the varnish gets impregnated into the paperboard more efficiently.

According to another embodiment, the cutting-out step comprises two sub-steps, one step for cutting out the side wall from a first pre-coated sheet of paperboard and the other step for cutting out the bottom from a second pre-coated sheet of paperboard. In this way, the density of varnish is defined according to whether the sheet is used for the bottom or for the side wall.

According to another embodiment, the paperboard used for the bottom is less thick and has a lighter grammage than the paperboard used for the side wall. In this way, the thickness and the grammage of the paperboard are defined according to whether the sheet is used for the bottom or for the side wall.

According to another embodiment, the cutting-out step comprises a sub-step in which the side wall and the bottom are cut out of the same sheet of pre-coated paperboard. In this way, only one paperboard sheet reference is used for manufacturing, thus simplifying the operations.

According to another embodiment, the deposit of dry extract of biodegradable varnish is 8 to 16 grams per $m^2$ on the paperboard face intended to be the interior of the cups and 2 to 6 grams per $m^2$ for the paperboard face intended to be on the exterior of the cups.

According to another embodiment, the step for coating with biodegradable varnish comprises a step for regulating the density of varnish by using at least one of the means taken from the following list: "a doctor blade passing over the paperboard sheet, an air knife, a Meyer rod". In this way, the layer of varnish used is homogenous and has a uniform thickness.

According to another embodiment, the method comprises a test step consisting of the exertion of a force on each side of the sealed joint binding the heat-sealed lateral sides of the side wall or the seal joint binding the side wall to the bottom until the sealed joint yields, the temperature for the following trials being increased if the sealed joint yields without the paperboard getting delaminated, de-fibered or torn. In this way, the method of manufacture is tested and the parameters are finalized before launching the production of the cups.

According to another embodiment, the method comprises a step for printing a graphic element on the external face of the side wall of the cup thus formed, said step taking place after a step of coating said face with a layer of 2 to 6 grams/$m^2$ of dry varnish extract.

4. BRIEF DESCRIPTION OF THE DRAWINGS

Other features and advantages of the invention shall appear from the following description given by way of an indicative and non-exhaustive example and from the appended drawings, of which.

5. DETAILED DESCRIPTION

In all the figures of the present document, the identical elements (or steps) are designated by a same numerical reference.

5.1 General Principle

The invention proposes a method for the manufacture of a cup that is meant to contain a food beverage. The method comprises a step for cutting out at least one sheet of coated paperboard to form the side wall and the bottom and a step for the heat-sealing of the sheets thus cut out to form the cup. The at least one paperboard sheet is coated on at least the inner side of the cup with a biodegradable varnish according to a coating/spreading technique.

5.2 Description of the Equipment for Producing Coated Paperboard

Prior to the manufacture of the cup and according to the invention, the method uses paperboard coated on at least one face with biodegradable varnish. The coating of paperboard is described with reference to FIG. 1 which presents a production line for coating paperboard according to a preferred example of an embodiment.

Figure 1:
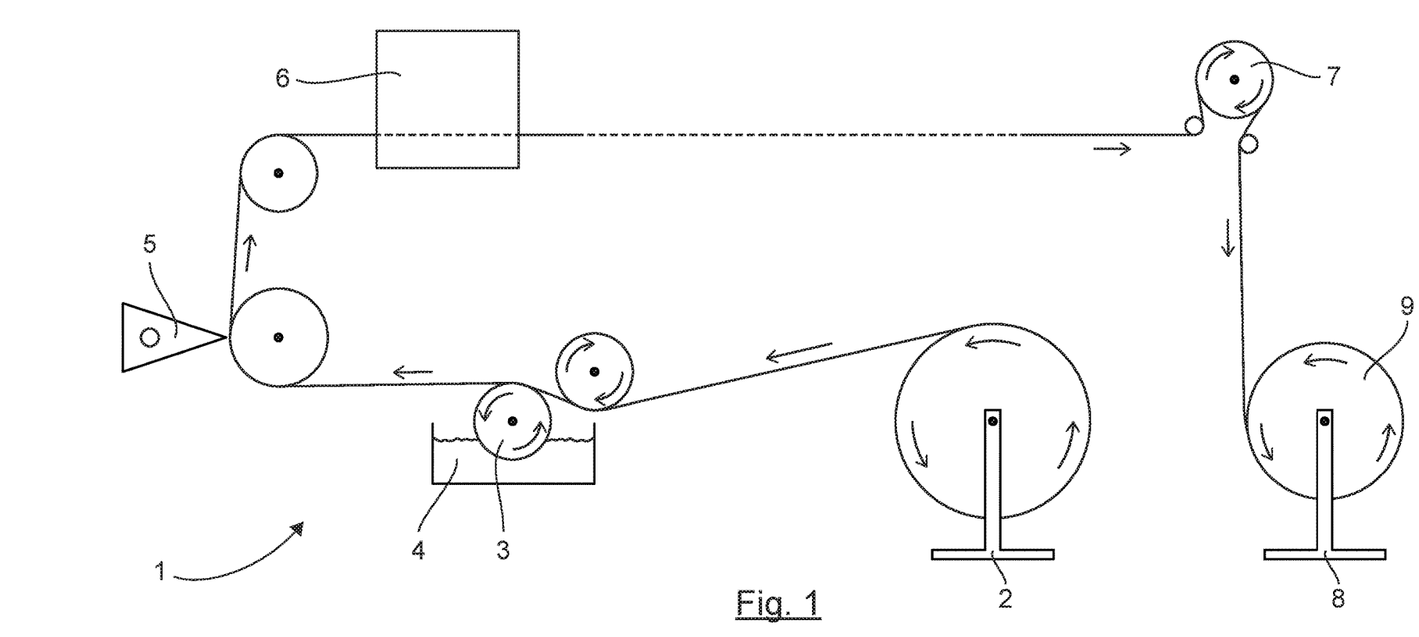
FIG. 1 is a synoptic view of a production line for producing coated paperboard according to a preferred exemplary embodiment.

The production line 1 comprises especially the following devices:
  a dispenser 2 having a store of a continuous sheet of virgin paperboard around a mandrel,
  a coating applicator cylinder 3 that transfers varnish to the paperboard. This cylinder plunges into a tub 4 containing varnish that is biodegradable and also possesses the characteristic of being easily composted. The cylinder, in its rotation, applies varnish to the paperboard placed in contact with the varnish on its surface of revolution. The speed of rotation of this cylinder is determined to provide the paperboard with an excess of varnish. The density of varnish is then regulated by means of an air knife (and/or a doctor blade depending on the installation). The speed of flow of the paperboard sheet on this cylinder is variable according to the type of coater used: from 50 to 60 m/min for the smallest installations to more than 200 m/min for the biggest installations, or again for assembly-line coaters in the paper industry, a device for generating an air stream 5, called an "air knife". This device is used to blow off excess varnish on the surface and thus maintain a constant thickness of layer and deposit of varnish per surface unit. Obtaining the correct deposit of varnish is obtained by a combination of the following factors: the angle of the air knife, the spread of the air knife relative to the paperboard and the flowrate of the air knife, a drying station 6. The station is preferably an oven, the interior of which is kept at a constant temperature. Other fast-heating devices are possible, especially using radiation, a cooling calender 7. This device is used to cool the coated paperboard before it is packaged in rolls. This device prevents the paperboard sheets from getting glued to each other because of the combination of heat following passage into the oven with the tension needed to wind the sheet on a reel, a winder 8 that retrieves the paperboard coated with biodegradable varnish and makes reels that are easy to transport and easy to use, for example for prepress printing and then the cutting out of the sheets that constitute the cups.

This production line 1 enables a production of a paperboard coated with varnish on a single face. It is perfectly possible to have a second or a third coating unit on such a line, each group comprising a coating applicator cylinder 3, an air knife generator 5 and a drying station 6 to coat one or two successive faces and/or to coat the other face of the paperboard. This method requires only one pass to coat the paperboard on both faces. The coating can be done off the production line on a specific machine or on the paper-producing line itself during the manufacturing of the paperboard. Whether it is coated on one face or on both faces, the coated paperboard sheet is wound about a mandrel to form a reel 9.

This production line 1 for producing paperboard uses the coating technique that gives a cover of quality and a good surface condition (the layer of varnish is even and uniform without any shortcoming or groove or flaw by which the liquid can enter the paperboard and cause the cup to soften or leak). Through this coating technique, the layer of varnish is made uniform and does not have any flaws or grooves by which the liquid could enter the paperboard and cause softening or leakages. In addition, the layer of varnish is even in terms of grams per unit of surface, making it possible to obtain high quality solders.

The coating/spreading operation can be carried out with a Meyer rod type system, a doctor blade coater, an air knife coater or a combination of these different techniques. The different experiments have shown that the technique of coating with an air knife coater provides more precise control the deposit of dry varnish extract and gives a uniform and even layer on the surface of the paperboard described here above.

The heat-sealing capacity of the varnish allows a weld following a very short contact, less than 2 tenths of a second for example and at a temperature ranging for example from 300° C. to 600° C. Such characteristics allow an industrial production rate of cups of up to 300 containers per minute. The varnish is also hydrophobic so as to make the paperboard completely watertight but also to hot beverages (greater than 90° C.) and cold that can be basic neutral or acid depending on their nature for a contact time of 30 minutes. Finally, the varnish is biodegradable so as to confer on the cups that it will allow to achieve, once the coating made on the paperboard, characteristics of recyclability, repulpability in paper, biodegradability, compostability and printability. The paperboard thus coated with varnish must be able to comply with compostability standards, for example the EN13432 standard.

An example of a biodegradable varnish used is acrylic-grafted parafin wax. This type of varnish gives the paperboard the properties of heat sealing and resistance to water and to grease. It is indeed preferable to use an aqueous phase varnish consisting of resins based on paraffin waxes, to make cups for receiving hot and cold beverages, and respectful of the environment.

The deposit of biodegradable dry varnish extract to make paperboard cups is preferably 8 to 16 gr/m$^2$ on the paperboard face that is to be the interior of the cups and if necessary 2 to 6 gr/m$^2$ on the paperboard face that is to be the exterior of the cups. The deposit on the external faces is optional. However, it improves the quality of the solders on the side wall and bottom and makes it possible especially to provide tighter proofing of the paperboard on the external face of the cups because of the phenomenon of condensation that can appear on this face when the cup is filled with a cold beverage and more particularly with ice cubes or ice cream. The deposit of 8 to 16 gr/m$^2$ of dry varnish extract on the paperboard face meant to be the interior of the cups can be carried out in one or more passes as described here above by using several coating units. Since the deposit of 2 to 6 gr/m$^2$ of dry varnish extract on the paperboard face meant to be the exterior of the cups is smaller, only one pass is generally sufficient.

According to one improvement, the varnish is supplied in concentrated form. This requires cup manufacturers to dilute it. The varnish stretching rate is determined as a function of the concentration of varnish, its initial viscosity, the expected deposit in dry extract, the equipment present on the coater and the linear speed of passage of the paperboard. The more dilute the varnish, the greater the extent to which it penetrates the paperboard. The less dilute the varnish, the greater the extent to which it remains on the surface of the paperboard. When 8 to 16 gr/m$^2$ of varnish is deposited in several passes, a diluted varnish is applied to the first pass in order to penetrate the paperboard (which is fiber) and to close the support (in order to obtain the effect of a sub-layer). A less dilute varnish is then applied to the following layers in order to obtain a uniform and even layer of varnish on the surface of the paperboard thus ensuring proofing and heat-sealing. The percentage of dilution depends largely on the equipment used, the number of passes made and the linear speed of passage of the paperboard. For example, in the case of a movement of the paperboard sheet at 50 meters per minute and for a varnish concentration of 50%, experiments have shown that to obtain high-performance deposits of dry extract, it is possible to dilute the varnish to 50% for the internal face and to 250% for the external face and to carry out only one pass. Another experiment on another type of machine has given the same result for different values of dilution: 20% of dilution for the internal face and 140% for the external face for a speed of 60 meters per minute. It is therefore possible to set up ranges of dilution of 15% to 60% for the internal face and 100% to 300% for the external face in the case of coating in a single pass given the speeds and types of coaters used.

Once the paperboard is coated with biodegradable varnish, it is dried in one or more drying stations 6 at a high temperature (150° C. to 250° C. for example) in order to form the expected layer on the surface of the paperboard. The drying temperature depends on the equipment used on the coater (electrical drying system, direct or indirect gas drying system, etc.), the linear speed of passage of the paperboard, the viscosity of the varnish and of the dry extract deposit made. Depending on the equipment and the drying temperatures used, it may be necessary to cool the coated paperboard by means of a cooling calender 7 before making the reel 9. Given that the biodegradable varnish has heat-sealing properties, the cooling prevents the turns of varnish-coated paperboard from getting joined together or stuck together during the reeling process.

We shall see here below that the cup is manufactured out of two sheets of pre-cut paperboard constituting the side wall and the bottom. This is the case for cups for which the grammage of the paperboard for the bottom and for the side wall are different. The deposit of varnish can be kept at 8 to 16 $gr/m^2$ of dry extract on the internal face and 2 to 6 $gr/m^2$ on the external face, but the density of varnish can be different depending on the grammage of the paperboard. If the characteristics of these two sheets are different in terms of density of biodegradable varnish, then they come from two different reels. Depending on the formats of the cups, the reels of paperboard used for the side walls have characteristics of thickness ranging from 250 to 500 microns and a grammage of 190 to 400 $gr/m^2$. The reels of paperboard for the bottom have a thickness ranging from 250 to 370 microns and a grammage of 190 to 300 $gr/m^2$ depending on the format of the cup. In general, the sheet of paperboard for the bottom is less thick and has a lighter grammage than the sheet of paperboard used for the side wall. According to one alternative embodiment, the characteristics of these two sheets are identical in terms of grammage and thickness. In this case, the two sheets constituting the bottom and the side wall can come from the same reel.

Figure 2:
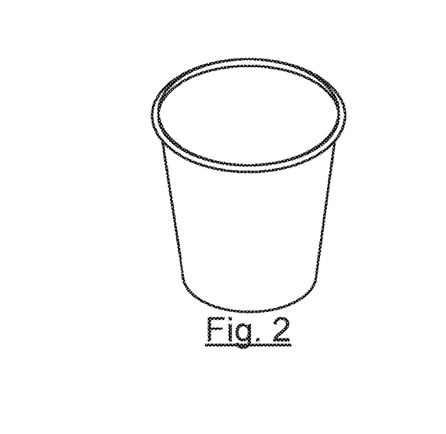
FIG. 2 represents an example of a cup manufactured according to the method of the present application.

After having presented the devices and equipment needed to manufacture a paperboard cup, we shall now explain the way in which these elements cooperate within the framework of a method for manufacturing said cup. An example of a cup manufactured according to the method that is the object of the present application is illustrated in FIG. 2.

5.3 Description of Steps of the Method of Manufacture

In general, the manufacturing process comprises at least the following three steps:

coating in reels, printing coated reels,

Shaping into cups reels previously coated and printed.

The succession of these 3 steps allows the realization of cardboard cups using a biodegradable varnish and not polyethylene.

Figure 3:
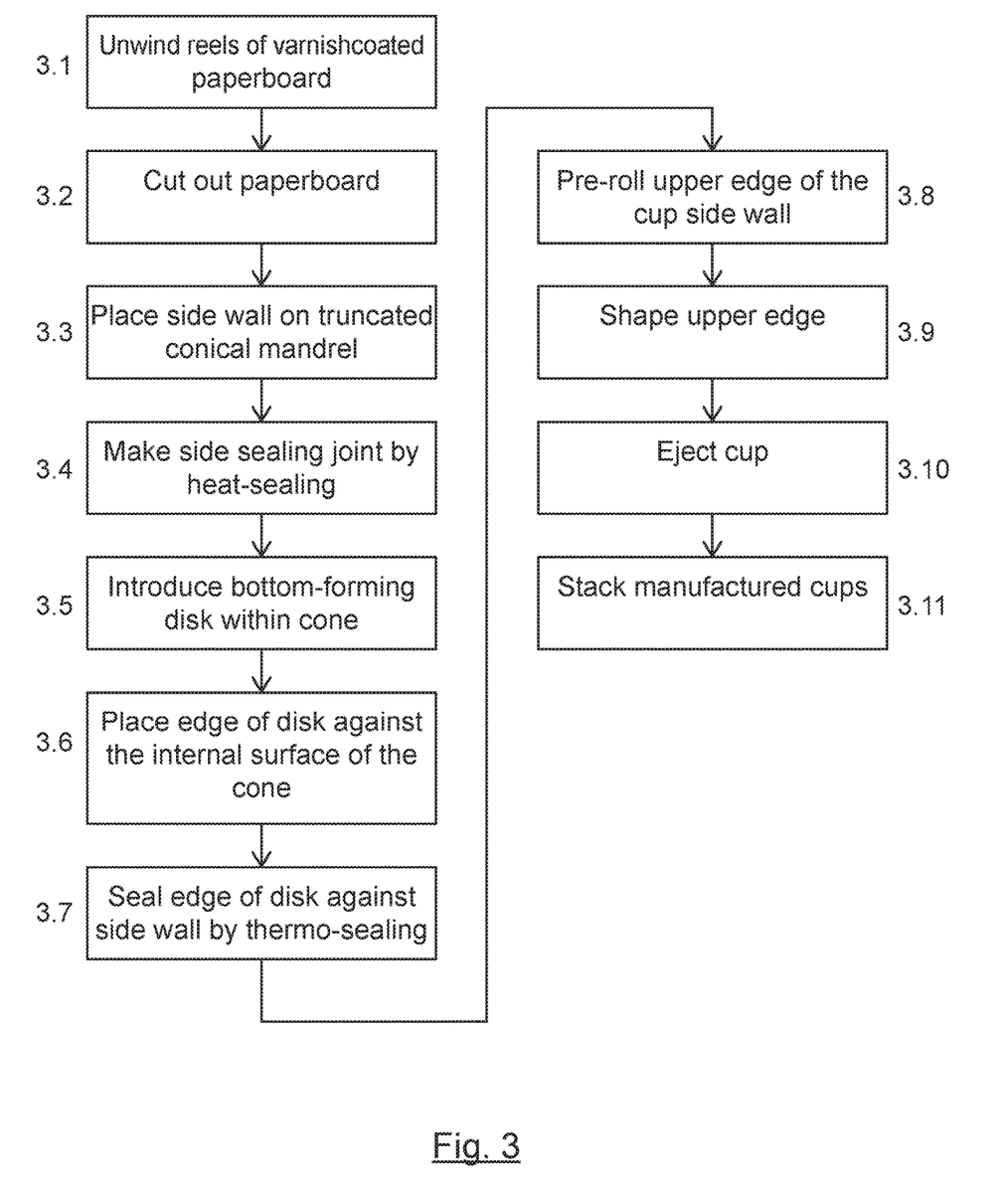
FIG. 3 shows a block diagram of the steps of a method for manufacturing cups, according to a preferred exemplary embodiment.

According to one example of an embodiment illustrated in FIG. 3, the method for manufacturing cups can be subdivided into 11 successive steps, some of which are optional while others are provided with alternative embodiments. The method of manufacture described here below begins after the making of the reels around which a coated paperboard sheet is wound, coated with one or more layers of varnish on at least one face. This paperboard sheet is produced by the coating of varnish by means of an air knife coater in order to ensure a deposit of 8 to 16 $gr/m^2$ of dry varnish extract on the paperboard face turned towards the interior of the cups and possibly a deposit of 2 to 6 $gr/m^2$ of dry varnish extract on the paperboard face turned towards the exterior. The work on this paperboard sheet is done in reels of great widths. These reels may or may not be pre-printed in the case of paperboard intended for the side walls of the cups and re-slit into smaller widths of different sizes depending on whether it is the side wall or the bottom and depending on the format of the cups. The biodegradable varnish used permits printing using a printing ink deposited by known printing techniques such as: flexography, heliography, offset or again digital pre-printing techniques.

Figure 4:
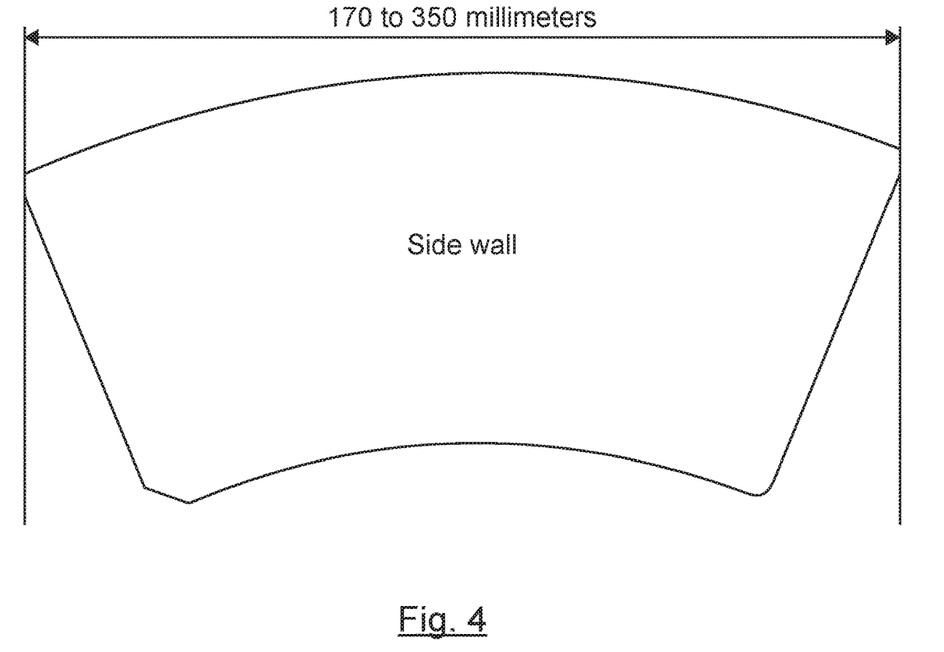
FIG. 4 is an example of the cutting out of a paperboard sheet to constitute the side wall of the cup.
Figure 5:
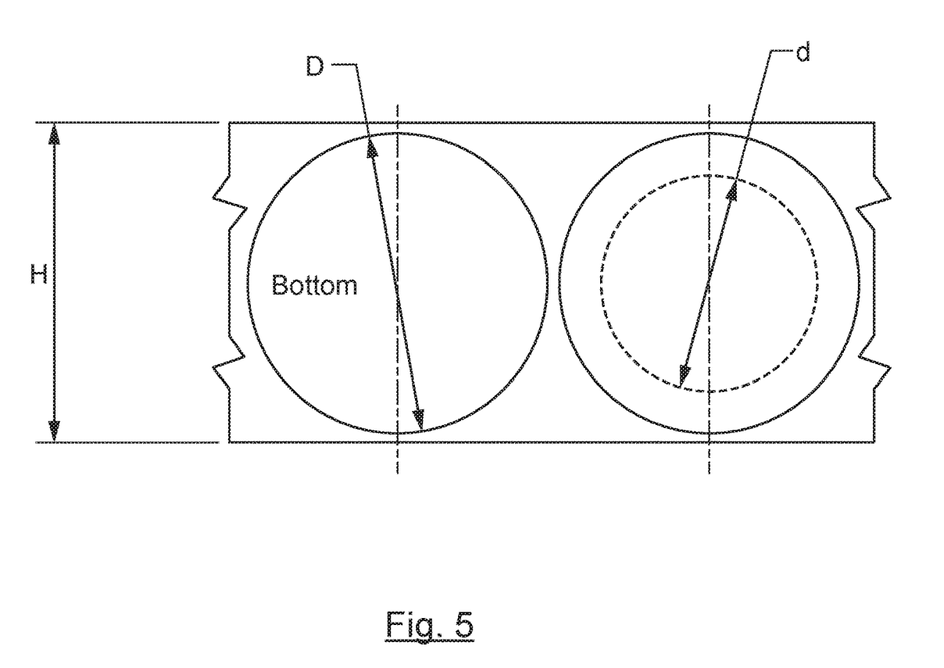
FIG. 5 shows an example of the cutting out of a paperboard sheet to constitute the bottom of the cup.

The first stage 3.1 consists in unwinding the two reels used to make the side wall and the bottom of the cup, these two reels preferably having different widths. The turns of paperboard superimposed on one another around the axes of the two reels should not be joined or stuck together. Otherwise this would have the effect of tearing off or degrading the layer of varnish and this would thus impair the proofing and the quality of the sealing joints. A cup consists of two cut sheets. A first sheet, an example of which is shown in FIG. 4, has the shape of a ring portion cut on each side by a line. This first sheet constitutes the side wall of the cup. The greatest width of the side wall as indicated in the figure varies from 170 to 800 millimeters depending on the size of the cup. A second sheet, an example of which is shown in FIG. 5, is a disk. This sheet is used to make the bottom of the cup. The diameter D of the disk is larger than the diameter d of the bottom of the cup. The width H of the reel varies from 56 millimeters to 108 millimeters depending on the size of the cup.

Once the varnish-coated paperboard is unrolled, the cutting (step 3.2) is carried out for the side walls (the cone is unrolled flat) and for the bottom (disk). The cutting out is done using knives present on the cutting out press. The cutting is clean without being abrasive, thus preventing the production of pieces of fiber or other fluffy elements on the sites.

At the step 3.3, the body of the cup is formed by rolling the side wall about a conical mandrel. To prevent the biodegradable varnish from getting glued to the mandrel or simply getting fouled, it should not be dusty or sticky at the temperature at which the mandrel is used. To prevent this phenomenon, the heating temperature on the mandrel side should be lowered and the heating temperature external to the mandrel should be increased in order to obtain lateral sealing while maintaining the same melting point. Following this modification of the parameters, the sealing quality must be of course verified. The dimensions of the mandrel are determined so that the right and left sides of the paperboard sheet forming the side wall overlap over 6 to 12 millimeters on average according to the cup formats considered.

This overlap makes it possible to obtain the lateral sealing (step 3.4). The overlap zone is pressed for a period of time of less than one second and heated by a hot air blower (300 to 600° C. depending on the sealing areas 1). The duration and temperature are determined so as not to make the entire unit melt by burning the varnish layer. The lateral sealing of the side wall of the cup is considered to be right when it is impossible to separate the two joined parts by hand without delaminating, de-fibering or again tearing the paperboard.

The duration and the temperature are determined by experiment. The first trials are made at the speed of the machine over a duration of less than one second at a lowest temperature of about 300° C., the cup thus made being controlled through a production controls procedure during which force needs to be exerted on each side of the sealing joint until the latter yields. If the sealing joint is broken without the paperboard getting delaminated, de-fibered or torn, it is not compliant. It is then necessary to increase the temperature for the next cups to be tested. This will continue until the right sealing joint is obtained without however burning the paperboard which would make heat-sealing impossible.

When the cone of the cup is made, at the step 3.5, the bottom disk is placed on the mandrel at the circular edge of the cone having the smallest diameter. The unrolling of the bottom is then done (step 3.6) by means of specific tool. The edge of the disk forming the bottom is folded to be placed flat against the internal face of the cone forming the body of the cup.

Figure 6:
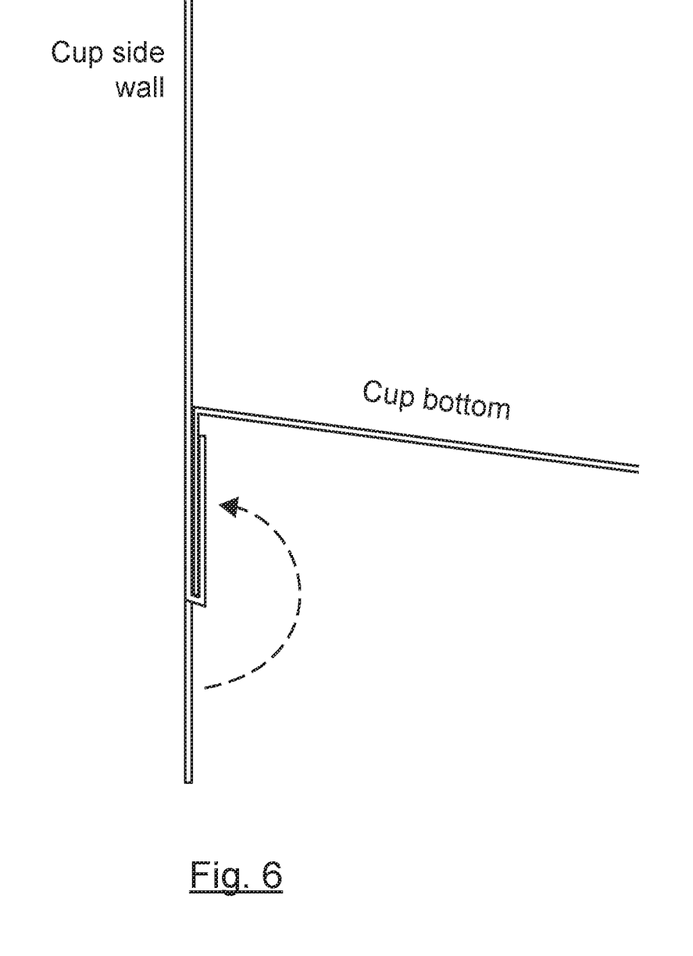
FIG. 6 presents the cooperation between the two paperboard sheets to form the connection to the bottom of the cup according to an exemplary embodiment.

The edge of the disk is placed flat against the external face of the side wall on a height of 4 to 13 millimeters according to the format of the cup (characterized especially by the bottom depth). Then, as shown by the arrow that can be seen in FIG. 6, the lower part of the cone is folded at angle of 180° towards the interior to trap the edge of the disk forming the bottom of the cup between two layers. At the step 3.7, a second sealing joint is made by strongly pressing and heating the lower part of the cone. The paperboard is pressed for a duration of less than one second and heated by a hot air blower (300 to 600° C. depending on the sealing zones). The duration and the temperature are determined so as not to cause the entire unit to melt and so as not to cause the coat of varnish to melt. The sealing of the bottom of the cup is right when it is impossible to separate the two joined parts by hand without delaminating, de-fibering or again tearing the paperboard.

Figure 7:
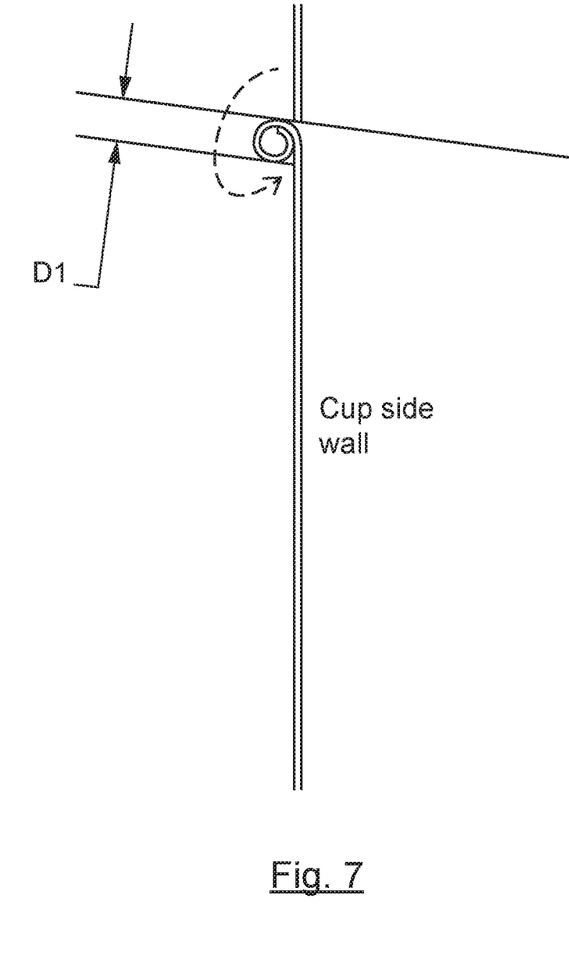
FIG. 7 represents the annular rolling of the upper edge of the cup to form a rim according to one exemplary embodiment.

The upper edge can now be rolled (step 3.8). The side wall is shaped at the top part by a specific tool. The top part of the side wall is folded in a rounded shape by a rolling tool in order to give it an annular circular-sectioned shape that will subsequently be comfortable to the cup user's lips. This rolling operation, which forms a "rim" is done on at least 360° C. and is illustrated by the dashed arrow seen in FIG. 7. The annular rolling of the upper edge of the cup also makes it possible to shape a thick rim on to which a circular lid made of plastic or any other food material is clipped. The diameter, denoted as D1 in FIG. 7, of the circular rim feature of the upper edge of the side wall of the cup is defined by the rolling tool, this diameter generally varying from 2 to 5 millimeters. The rolling operation is carried out at low heat (50° C. to 150° C.) so that this position is maintained during the cooling stage.

At the step 3.9, the upper edge of the cup is integrally rolled. Care is taken at this step to keep the lateral sealing joint, made previously at the step 3.4, intact in order to preserve the efficient proofing quality of the cups.

The manufacture of the varnish-coated cup is now finished, and the cup is now ejected (step 3.10). The ejection is done by compressed air, and the cups can then be conveyed through a channel, namely a piping, at the end of which they are stacked in ramps. Before the stacking, the cups are sufficiently cooled following the ejection and sent towards the channel to prevent them from getting stuck to each other and so that the visual element printed on the cup and its final appearance do not deteriorate. The addition of the visual aspect is done on the varnish-coated reel intended for the cup side wall. The external face is preferably printed after it has been coated with a layer of 8 to 16 gr/m$^2$ of dry varnish extract.

At the step 3.11, the cups made out of varnish-coated paperboard are stacked properly one within the other without deforming or again destroying the lateral and bottom sealing joints. The packaging of the cups takes account of the fact that they have to be easily unpacked without any static electricity which would be harmful for vending or other similar types of automatic dispensers. The packaging of the racks of cups is sized to minimize the pressure exerted on the cups to the utmost so that they are made to enter one another. In this way, the cups can undergo the handling needed for storage and transport with deterioration and in providing for easy unstacking for the final user.

According to one alternative embodiment, the finished cup is checked through a second production controls procedure during which it is necessary to carry out leakage tests. These tests consist in filling a certain number of cups with different chemical solutions of different levels of aggressiveness depending on the final use of the cup (soda, coffee, ice cream, etc.) for a precise duration and at a frequency defined by an internal quality procedure. If no leakage appears, then the cups are compliant with requirements. If not, the machine settings, and more particularly the duration and temperature of the solders, must be made more precise.

According to another variant, the finished cup is covered with a lid provided with an injection nozzle, and the interior is pressurized by a gas. The absence of leakages can thus be validated in this way.

The invention is not limited to the embodiments that have just been described. In particular, the cups thus manufactured can be used with all types of beverages.

The invention claimed is:

1. A method for manufacturing a biodegradable and home compostable cup intended for containing a food beverage, comprising:
    cutting out at least one sheet of coated paperboard to form a side wall and a bottom; and
    joining the at least one sheet thus cut out by heat-sealing to form the cup, wherein said at least one sheet is coated on at least an interior side of the cup with a biodegradable and home compostable varnish according to a water solution coating/spreading technique, the water solution coating/spreading technique comprising the following steps:
    applying the at least one sheet against at least one coating applicator cylinder, each of said at least one coating applicator cylinder plunging into a tub containing said varnish forming at least one coated sheet, said biodegradable and home compostable varnish having heat-sealing capacities to weld the at least one sheet thus cut out,
    followed by passing the thus at least one coated sheet in front of an air knife generator to ensure a uniform thickness of the varnish throughout a surface of the paperboard, and
    followed by drying the thus at least one coated sheet in front of a drying station, wherein the biodegradable and home compostable varnish has a deposit of dry extract of 8 to 16 grams per m$^2$ on the paperboard face on the interior side of the cup.

2. The method for manufacturing according to claim 1, wherein the coating/spreading technique also comprises the following step:
    passing the at least one coated sheet to a cooling calendar.

3. The method for manufacturing according to claim 2, wherein the at least one sheet is applied against a succession of several cylinders plunging into tubs containing different densities of varnish depending on a deposit to be made, wherein first of the tubs placed in contact with the at least one sheet have greater dilution than following tubs for an application in several layers on a same face.

4. The method for manufacturing according to claim 1, wherein the cutting out step comprises two sub-steps, one sub-step of cutting out the side wall from a first pre-coated sheet of paperboard and the other sub-step of cutting out the bottom from a second pre-coated sheet of paperboard.

5. The method for manufacturing according to claim 4, wherein the paperboard used for the bottom is less thick and has a lighter grammage than the paperboard used for the side wall.

6. The method for manufacturing according to the claim 1, wherein the cutting out step comprises a sub-step in which the side wall and the bottom are cut out of the same sheet of coated paperboard.

7. The method for manufacturing according to claim 1, wherein the biodegradable and home compostable varnish has a deposit of dry extract of 2 to 6 grams per $m^2$ on an exterior side of the cup.

8. The method for manufacturing according to claim 1, wherein the coating/spreading technique comprises a step of regulating a density of the varnish by using at least one of the elements taken from the following list: a doctor blade passing over the at least one sheet of coated paperboard, an air knife, a Meyer rod.

9. The method for manufacturing according to claim 1, further comprising a test step comprising exerting a force on a first and a second side of a sealed joint binding lateral sides of the side wall or a sealed joint binding the side wall to the bottom until the sealed joint yields, wherein a temperature for following trials being increased if the sealed joint yields without the paperboard getting delaminated, de-fibered or torn.

10. The method for manufacturing according to claim 1, further comprising printing a graphic element on an external face of the side wall of the cup thus formed, said printing taking place after coating said external face with a layer of 2 to 6 grams/$m^2$ of dry varnish extract.

* * * * *